(12) United States Patent
Molenberghs et al.

(10) Patent No.: US 11,577,203 B2
(45) Date of Patent: Feb. 14, 2023

(54) MEMBRANE SUPPORT MADE WITH PREFORMED SHEETS

(71) Applicant: VITO NV (VLAAMSE INSTELLING VOOR TECHNOLOGISCH ONDERZOEK NV), Mol (BE)

(72) Inventors: Bart Molenberghs, Mol (BE); Chris Dotremont, Mol (BE)

(73) Assignee: VITO NV (VLAAMSE INSTELLING VOOR TECHNOLOGISCH ONDERZOEK NV), Mol (BE)

( * ) Notice: Subject to any disclaimer, the term of this patent is extended or adjusted under 35 U.S.C. 154(b) by 28 days.

(21) Appl. No.: 16/308,379

(22) PCT Filed: Jun. 2, 2017

(86) PCT No.: PCT/EP2017/063544
§ 371 (c)(1),
(2) Date: Dec. 7, 2018

(87) PCT Pub. No.: WO2017/211738
PCT Pub. Date: Dec. 14, 2017

(65) Prior Publication Data
US 2019/0134567 A1 May 9, 2019

(30) Foreign Application Priority Data

Jun. 8, 2016 (EP) ..................................... 16173494

(51) Int. Cl.
*B01D 63/08* (2006.01)
(52) U.S. Cl.
CPC ......... *B01D 63/082* (2013.01); *B01D 63/081* (2013.01); *B01D 2313/04* (2013.01);
(Continued)

(58) Field of Classification Search
CPC ................ B01D 63/082; B01D 63/081; B01D 2313/04; B01D 2313/12; B01D 2313/13;
(Continued)

(56) References Cited

U.S. PATENT DOCUMENTS

| 2007/0023348 A1 | 2/2007 | Harms et al. |
| 2008/0000827 A1 | 1/2008 | Bruss |

(Continued)

FOREIGN PATENT DOCUMENTS

| EP | 0662341 A1 | 7/1995 |
| EP | 2332636 A1 | 6/2011 |

(Continued)

OTHER PUBLICATIONS

International Search Report and Written Opinion from International Application No. PCT/EP2017/063544, dated Aug. 24, 2017.

*Primary Examiner* — Patrick Orme
*Assistant Examiner* — Donovan Bui-Huynh
(74) *Attorney, Agent, or Firm* — Merchant & Gould P.C.

(57) ABSTRACT

A planar membrane cartridge includes a support and a semi-permeable membrane layer. The support includes a first layer attached to a second layer and defining a front face and a back face of the support. At least one of the first layer and the second layer form a first embossment and a second embossment. Respective back faces of the first layer and the second layer are attached to each other along edges of the first embossment and of the second embossment, such that the first embossment defines a fluid compartment between the first layer and the second layer and the second embossment defines an internal channel between the first layer and the second layer which is isolated from the fluid compartment. An area of the first layer corresponding to the first embossment is covered by the semi-permeable membrane layer.

21 Claims, 8 Drawing Sheets

(52) U.S. Cl.
CPC ...... *B01D 2313/12* (2013.01); *B01D 2313/13* (2013.01); *B01D 2313/26* (2013.01); *B01D 2315/06* (2013.01)

(58) Field of Classification Search
CPC ............ B01D 2313/26; B01D 2315/06; B01D 69/10; B01D 67/0013; B01D 69/06; B01D 2313/02; B01D 2313/10; B01D 2313/14; B01D 2313/24; B01D 2313/38; B01D 2321/04; B01D 2323/06; B01D 2323/42; B01D 2323/46; B01D 2325/022; B01D 61/18; B01D 61/364; B01D 61/422; B01D 61/50; B01D 61/52; B01D 63/10; B01D 65/003; B01D 65/02; B01D 65/104; B01D 67/0002; B01D 69/12; B01D 2313/146; B01D 63/00; B01D 63/08; B01D 2325/04; B01D 2325/08; B01D 2325/20; B01D 61/20; B01D 65/00; B01D 67/0086; B01D 69/02; B01D 71/24; B01D 71/70; B01D 35/153; B01D 29/58; B01D 29/114; B01D 27/08; B01D 35/30; B01D 29/23; B01D 36/001; B01D 35/027; B01D 63/103; B01D 53/22; B01D 61/362; C02F 3/1273; C02F 1/44; C02F 1/441; C02F 1/444; C02F 1/003; Y02W 10/10; Y02W 10/15; G02B 6/3897; G02B 6/4452; G02B 6/4455; Y10T 428/1334; A01N 1/0263; A61J 1/10; A61J 1/1468; A61M 1/0272; A61M 1/3403; A61M 2202/0208; A61M 2205/7536; A61M 39/10
See application file for complete search history.

(56) References Cited

U.S. PATENT DOCUMENTS

| | | |
|---|---|---|
| 2008/0156730 A1 | 7/2008 | Heinen |
| 2010/0243552 A1* | 9/2010 | Okawa .................. B01D 61/18 |
| | | 210/321.8 |
| 2011/0163025 A1* | 7/2011 | Ishikawa ................ B01D 61/18 |
| | | 210/321.84 |
| 2015/0027948 A1* | 1/2015 | Doyen .................. B01D 69/12 |
| | | 210/636 |
| 2016/0310902 A1* | 10/2016 | Sawant .................. B01D 61/50 |
| 2017/0320019 A1* | 11/2017 | Doyen ................. B01D 63/081 |

FOREIGN PATENT DOCUMENTS

| | | | |
|---|---|---|---|
| JP | 9-299951 A | | 11/1997 |
| JP | 09299951 A | * | 11/1997 |
| WO | 03/037489 A1 | | 5/2003 |

\* cited by examiner

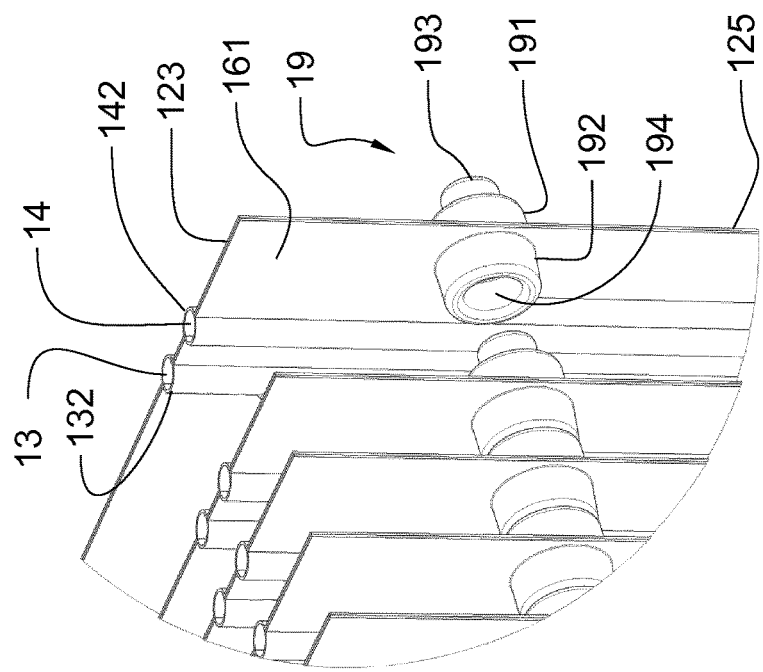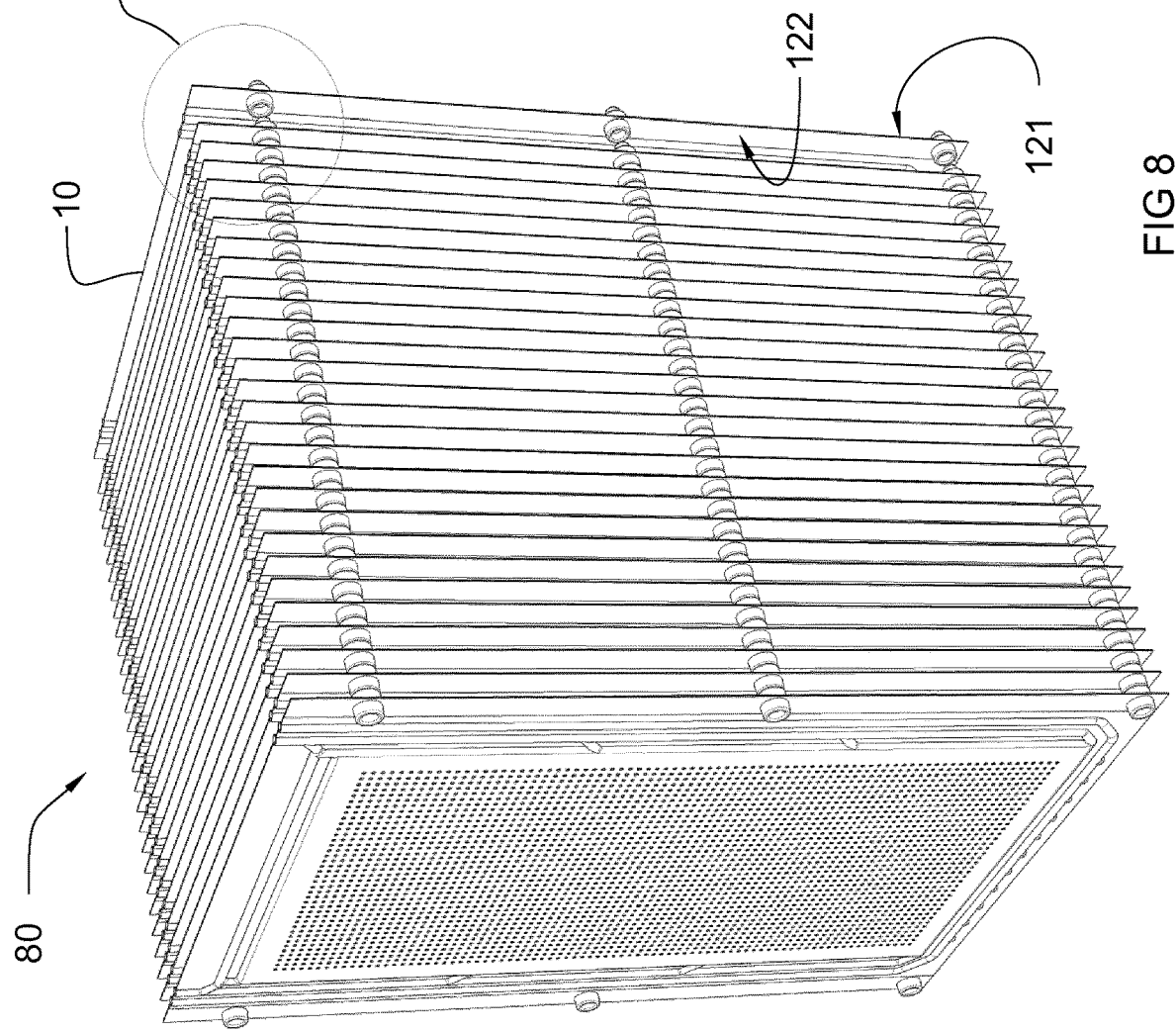

MEMBRANE SUPPORT MADE WITH PREFORMED SHEETS

This application is a National Stage Application of International Application No. PCT/EP2017/063544, filed 2 Jun. 2017, which claims benefit of Ser. No. 16/173,494.2, filed 8 Jun. 2016 in Europe and which applications are incorporated herein by reference. To the extent appropriate, a claim of priority is made to each of the above-disclosed applications.

BACKGROUND OF THE INVENTION

The present invention is related to membrane cartridges comprising a support for attachment of (a) semi-permeable membrane(s) thereto, in which the support is made from polymer sheets. Particularly, the sheets are shaped prior to assembling the support.

Membrane cartridges comprising a support made from plastic sheets is known from US 2008/0000827, Bruss Ulrich, 3 Jan. 2008. The support comprises an inner layer that has nubs as bumps on both faces and outer layers flanking the inner layer. The outer layers have holes for conducting filtrate into the inner layer. The layers are pressed, welded or glued in a fluid tight manner in edge regions. The outer layers are in turn covered by a layer of prefabricated membrane material.

Membrane cartridges of the above kind are e.g. used in filtration modules, in which a large number of cartridges are stacked. Typically, such as in wastewater purification and bioreactors, the filtration modules are completely submerged in the waste water. Air bubbling is provided underneath the stack of filtration cartridges in order to create an upward flow of waste water along the membranes. The air bubbles are also effective in scrubbing the membrane surface thereby removing solids which would tend to adhere to the membrane. Filtration modules of the above kind are described in e.g. WO 03/037489 and EP 0662341.

It has been observed that air bubbling is of critical importance for a correct functioning of the filtration module. It should be ensured that air bubbling is applied as uniformly as possible along all the membrane surfaces of each cartridge, so that each cartridge within the module can function optimally. It is to be further noted that aeration counts for a significant part of the operational cost of filtration apparatuses.

In addition, there is a tendency towards constructing larger bioreactors and filtration apparatuses, and in these large systems it is key to make optimal use of the available volume. Therefore there is a tendency towards increasing the membrane (filtration) surface area per unit volume as much as possible. In this regard, the aerators used underneath the stacks of filtration cartridges take up a fairly large volume which cannot be used for filtration.

SUMMARY OF THE INVENTION

It is an object of the present disclosure to provide a more suitable design of membrane cartridges and/or modules, which can respond to the above needs. It is an object to provide more compact systems with similar or even improved performance compared to prior art systems. It is an object to provide a membrane cartridge which is economical and easy to manufacture. It is an object to provide systems having a lower operational cost.

According to aspects of the present disclosure, there is therefore provided a planar membrane cartridge.

The planar membrane cartridge comprises a support and a semi-permeable membrane layer. The support comprises a first layer attached to a second layer, with the first layer defining a front face of the support and the second layer defining a back face of the support. The support comprises an edge area portion enclosing a central area portion. Both the first layer and the second layer extend throughout the edge area portion and the central area portion.

The first layer is porous in the central area portion whereas the edge area portion is advantageously nonporous for both first and second layers. At least one of the first layer and the second layer form a first advantageously hollow embossment in the central area portion protruding from the edge area portion in the direction of the respective face to define a first fluid compartment between the first layer and the second layer. The first layer and the second layer are attached in the edge area portion to form a (fluid or liquid) seal which surrounds the first fluid compartment.

According to an aspect, the support comprises a channel area portion spaced apart from the central area portion and being surrounded by the edge area portion. At least one of the first layer and the second layer form an advantageously hollow embossment in the channel area portion protruding from the edge area portion in the direction of the respective face to define an internal channel (i.e., a second fluid compartment) between the first layer and the second layer which is isolated from the first fluid compartment by the edge area portion, e.g. by the edge area portion forming a seal.

The semi-permeable membrane layer covers the first layer in the central area portion, and advantageously the edge area portion is free from covering by the semipermeable membrane layer. The semi-permeable layer is advantageously attached to the first layer.

Either one, and advantageously both the first layer and the second layer can be formed of a nonporous or impermeable polymer sheet. The polymer sheet is perforated or otherwise made porous in the central area portion to provide for porosity.

By providing a planar membrane cartridge made of layer materials which are shaped to form hollow protrusions and attaching the layers to each other in edge areas of the layers, an advantage in weight, cost, production and labour time can be obtained. With simple shaping techniques very complex designs of supports can be obtained starting from readily available layer or sheet materials, which can be easily and cost effectively shaped through conventional techniques. As a result, planar membrane cartridges integrating different functions within the same support can be obtained. The provision of separate fluid compartments within the support, each being possibly served by separate ports, additionally enables a whole new range of applications.

There is therefore described a use of membrane cartridges and/or modules according to aspects of the invention for dosing chemical compounds to the surrounding fluid through a separate compartment of the support. Dosing can be carried out in addition to permeate extraction through other compartments of the support. The chemical compounds can be antiscalants. A use of membrane cartridges and/or modules according to aspects of the invention for selective removal of compounds, such as inhibiting compounds through a separate compartment of the support is described. Removal can be carried out in addition to permeate extraction through other compartments of the support. The selective removal can be performed by liquid-liquid extraction. The selectively removed compounds can be reaction products of a feed stream, such as ethanol through pervaporation. Separate compartments of the support can each be configured to selectively remove different compounds (e.g. different reaction products) from a feed stream, such as through providing different membranes on different areas of the support.

According to further aspects of the present disclosure, there is provided a module for treating fluids comprising a stack of the above cartridges. The module is advantageously configured for use as a solid-liquid or liquid-liquid separator.

A solid-liquid separator, in particular a biomass reactor comprising at least one of the above modules for submerged operation is also described.

According to yet a further aspect of the present disclosure, there is provided a method of manufacturing a planar membrane cartridge.

BRIEF DESCRIPTION OF THE DRAWINGS

Aspects of the invention will now be described in more detail with reference to the appended drawings, which are illustrative, and wherein same reference numerals illustrate same or similar features, wherein:

FIG. 8 represents a perspective view of a stack of cartridges similar to the ones of FIG. 1, wherein the cartridges comprise spacers and connectors for attaching the cartridges to one another in a spaced apart relationship;

FIG. 9 represents a detail of the stack of FIG. 8; and

DETAILED DESCRIPTION OF THE PREFERRED EMBODIMENT(S)

Figure 1:
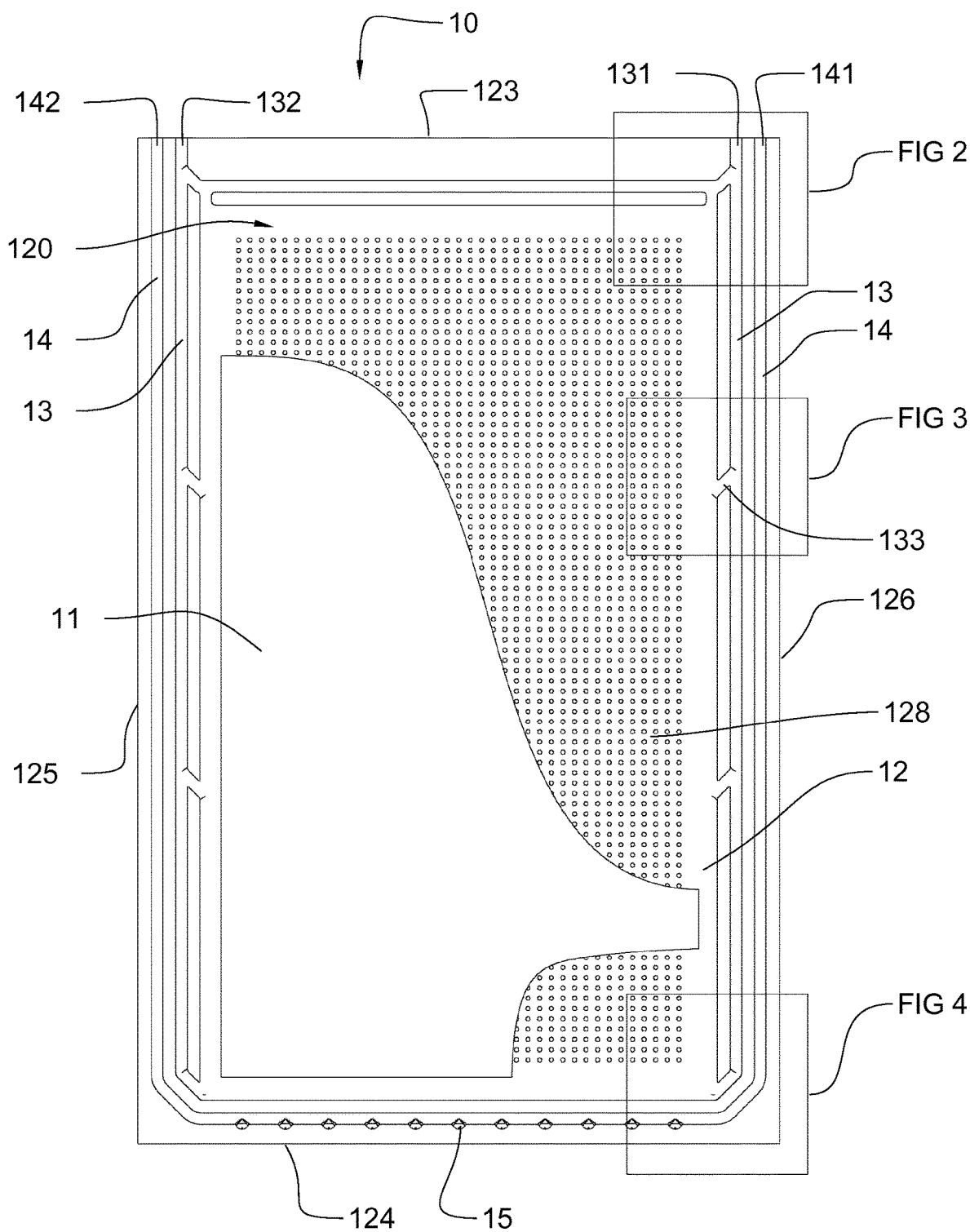
FIG. 1 represents a front view of a membrane cartridge according to aspects described herein.

A planar membrane cartridge, in short 'membrane cartridge', refers to an assembly comprising: (i) a backing support for a semi permeable membrane having at least one planar face or opposite planar faces, wherein one or more fluid conveying compartments are integrated within the support, (ii) the semi permeable membrane attached at the planar face(s) of the support, and, optionally, (iii) one or more fluid ports arranged in fluid communication with the compartments, for evacuating and/or feeding the fluid from/to the compartments. Fluid distribution manifolds can be provided between the fluid ports and the fluid compartments. Throughout the description, hence, the notion of cartridge does not necessarily imply the presence of fluid communication ports.

A fluid compartment refers to a void volume or chamber which may be in fluid communication with one or more fluid ports optionally provided in the cartridge assembly. The fluid compartment is integrated within the support.

A module refers to a stack of membrane cartridges. The membrane cartridges in a module typically all have semi permeable membrane layers attached on both sides of their support. The membrane cartridges are spaced apart in the stack to allow for a circulating ambient fluid to contact the semi-permeable membrane layers.

A semi-permeable membrane—in short membrane—as referred to in the present description refers to a layer or sheet of a solid, continuous and advantageously porous material having a structure allowing one or more compounds to be selectively transported through the membrane and hence enabling to separate the one or more compounds from a feed, which can be liquid or gaseous. A membrane hence features a determined permeability for the one or more compounds. The permselectivity can be determined by any kind of separation mechanisms, such as but not limited to a characteristic pore size of the membrane (e.g. microporous, ultraporous or nanoporous filtration membranes), by a characteristic attraction of specific charge types (e.g. an ion exchange membrane), selective sorption, or solution diffusion characteristics.

The membranes as referred to in the present description are advantageously configured for separation of compounds by one or more of: microfiltration, ultrafiltration, nanofiltration, reverse osmosis, forward osmosis, pressure retarded osmosis, membrane bioreactors, pervaporation, membrane distillation, supported liquid membranes, pertraction, membrane absorbers, enzyme reactors, membrane contactors, (reverse) electrodialysis, or gas separation. The membranes can be configured as ion exchange membranes.

The membranes as referred to in the present description are membranes advantageously obtained by subjecting a polymer solution to a phase separation process. Phase separation, which is also referred to as phase inversion, is a well-known process wherein demixing between the polymer and the solvent is induced. As a result of demixing, the polymer precipitates, thereby forming a membrane lattice with a desired structure (pore size, pore structure, etc.). Further process steps can be carried out in order to remove the solvent completely (e.g., washing) and to obtain a final pore structure (e.g., removing pore formers). Demixing can be induced based on several techniques. One possibility is thermally induced phase separation (TIPS), wherein demixing is induced by a temperature change at the interface of the polymer solution. Another possibility is to induce a chemical reaction in the polymer solution, causing demixing. This is referred to as reaction induced phase separation (RIPS). However, in the vast majority of cases, demixing is induced by phase diffusion. The polymer solution is contacted with another phase, being a liquid (liquid induced phase separation or LIPS), or a gas (vapour, referred to as vapour induced phase separation or VIPS), which is a non-solvent of the polymer but which is miscible with the solvent of the polymer solution. The liquid or vapour will diffuse through the polymer solution and cause a local change in the polymer solution composition, inducing demixing. As a result, the polymer precipitates from the solution. LIPS is also referred to as immersion precipitation. It will be convenient to note that any phase separation process can be applied to prepare the membranes as described herein.

The membrane comprises or consists of an advantageously thermoplastic polymer compound, which will be referred to hereinafter as the first polymer compound. The first polymer compound is the principal, characteristic or primary polymeric compound used for preparing the membrane forming solution, e.g. the polymer compound present in the membrane forming solution. The first polymer compound can be polysulfone (PSU), polyethersulfone (PESU), a grafted variant of them, or a copolymer of either one of the polymers. The first polymer compound can be polyvinylidene fluoride (PVDF), polyvinylidene chloride (PVDC), a grafted variant of them, or a copolymer of either one of the polymers. The first polymer compound can be polyvinyl chloride (PVC), chlorinated polyvinyl chloride (CPVC), a grafted variant of them, or a copolymer of either one of the polymers. The first polymer compound can be a polymer of the polyaryletherketone (PAEK) family, such as polyether ether ketone (PEEK), a grafted variant of any of these polymers, such as sulfonated polyether ether ketone (PEEK-WC), or a copolymer of any one of these polymers. The first polymer compound can be polychlorotrifluoroethene (PCTFE), polyether imide (PEI), polyimide (PI), polyamide imide (PAI), polyacrylonitrile (PAN), polyurethane (PUR), in particular a thermoplastic polyurethane, a grafted variant of any of these polymers, or a copolymer of any one of these polymers. The first polymer compound can be polyphenylene sulphide (PPS), cellulose acetate (CA), cellulose triacetate (CTA), a grafted variant of any of these polymers, or a copolymer of any of these polymers. The copolymers as indicated above can be suitable copolymers of the indicated polymer with any one of polyvinyl chloride (PVC), polymethyl methacrylate (PMMA), polycarbonate (PC), cyanoacrylate, cellulose triacetate (CTA), polyphenylene sulphide (PPS), polystyrene (PS), polyvinyl alcohol (PVA), polyvinyl acetate (PVAc), and polyamides such as polycaprolactam (nylon 6) and nylon-6,6. The first polymer compound can be a suitable blend of two or more of the above listed polymers. It will be convenient to note that the above list is not exhaustive and other polymer compounds can be used as the first polymer compound.

The amount of first polymer compound in the (dry) (final) membrane can be at least 5% by weight, up to at least 50% by weight. The first polymer compound can be an organic binder forming a matrix or lattice of the membrane, in which a possibly hydrophilic filler material is optionally dispersed. The filler material may be organic and is advantageously one or a combination of: hydroxypropylcellulose (HPC), carboxymethylcellulose (CMC), polyvinyl pyrrolidone (PVP), cross-linked polyvinyl pyrrolidone (PVPP), polyvinyl alcohol (PVA), polyvinyl acetate (PVAc), polyethylene oxide (PEO), polyethylene glycol (PEG), and glycerol. It will be convenient to note that the above list of filler materials is not exhaustive and other filler materials may be used. Such filler materials can be provided as pore formers and can be removed in a post treatment step, such as by washing in a bleach solution (e.g. for PVP). Other filler materials, which remain in the final membrane layer can be an amine, such as but not limited to one or a combination of: monoethanolamine (MEA), diethanolamine (DEA), polyethylenimine (PEI), aminopropyl-trimethoxysilane and polyethylenimine-trimethoxysilane. The filler material can be an amide or amine containing polymer, such as but not limited to one or a combination of: polyamide (PA), polyurethane (PUR), polyvinylamine (PVAm) and melamine. The filler material may be inorganic, such as one or a combination of $TiO_2$, $HfO_2$, $Al_2O_3$, $ZrO_2$, $Zr_3(PO_4)_4$, $Y_2O_3$, $SiO_2$, carbon, possibly on Pt, Ru or Rh support, $BaSO_4$, $BaTiO_3$, perovskite oxide powder materials, zeolites, metal-organic frameworks (MOF) and silicon carbides. Functionalized variants of the filler materials (such as aminated, sulfonated, acrylated) can be used. Combinations of the above organic and inorganic materials can be used as well as filler material.

Aspects presented herein are related to assemblies which lead to the manufacture of membrane cartridges, in particular so called flat sheet membrane cartridges. Such assemblies form a support for the membrane layer(s) in the membrane cartridge. Assemblies forming the support advantageously integrate multiple functionalities in a single cartridge. One such functionality can be permeate collection and extraction, which is known. An additional functionality can be air bubbling. Another additional functionality can be collection and extraction of a second, different permeate within the same cartridge. Yet another additional functionality can be gas diffusion. These and other functionalities can be integrated in one and the same support, without significantly increasing the size of the cartridge, hence leading to more compact modules. Such additional functionalities also allow for obtaining more uniform control of operational conditions throughout the stack, so that the operation of each single cartridge within the stack can be improved, leading to increased performance.

As will be described further herein, in one aspect, the support is made starting from nonporous polymer sheets, which are formed into a desired shape and assembled in a simple and cost effective process.

An example of a membrane cartridge according to aspects of the invention is shown in FIG. 1. Cartridge 10 comprises a support 12 onto which a semipermeable membrane layer 11 is attached, either at one side or face of the support 12 only, or at both sides of the support. Cartridge 10 as shown in FIG. 1 is particularly designed for use in submerged membrane bioreactors and advantageously integrates two different functionalities. However, as will be described further herein, the design of the membrane cartridges can be easily adapted to make them suitable for a wide variety of other applications. A first functionality of cartridge 10 is collection and extraction of permeate drawn through the semi-permeable membrane 11. Permeate is collected in a fluid compartment 120 integrated within the support 12 for the membrane 11, as will be described further. The permeate so collected is extracted through one or more outlet ports 131 and 132. A second functionality of cartridge 10 is air bubbling. To this end, the support 12 is provided at its bottom end with holes 15 for diffusing air from the cartridge into the fluid surrounding cartridge 10. Aeration holes 15 are in fluid communication with one or more air inlet ports 141, 142, advantageously provided adjacent the permeate extraction ports 131, 132. One or more channels 14 are integrated in the support 12 for conveying air from the inlet ports 141, 142 to the aeration holes 15. Likewise, one or more channels 13 may be integrated in support 12 for conveying permeate from the fluid compartment 120 to the outlet ports 131, 132.

Figure 2:
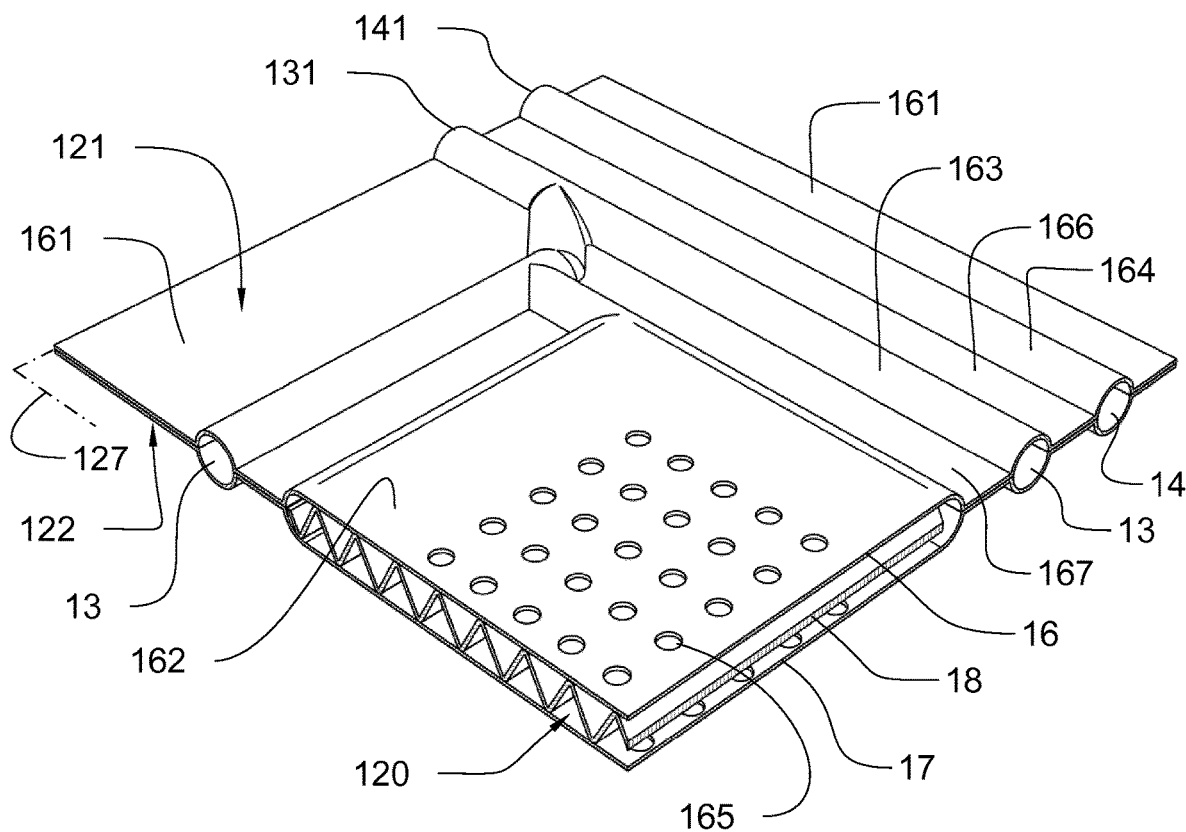
FIG. 2 represents a perspective view of a partial cut out (upper right corner) of the support of the membrane cartridge of FIG. 1.
Figure 3:
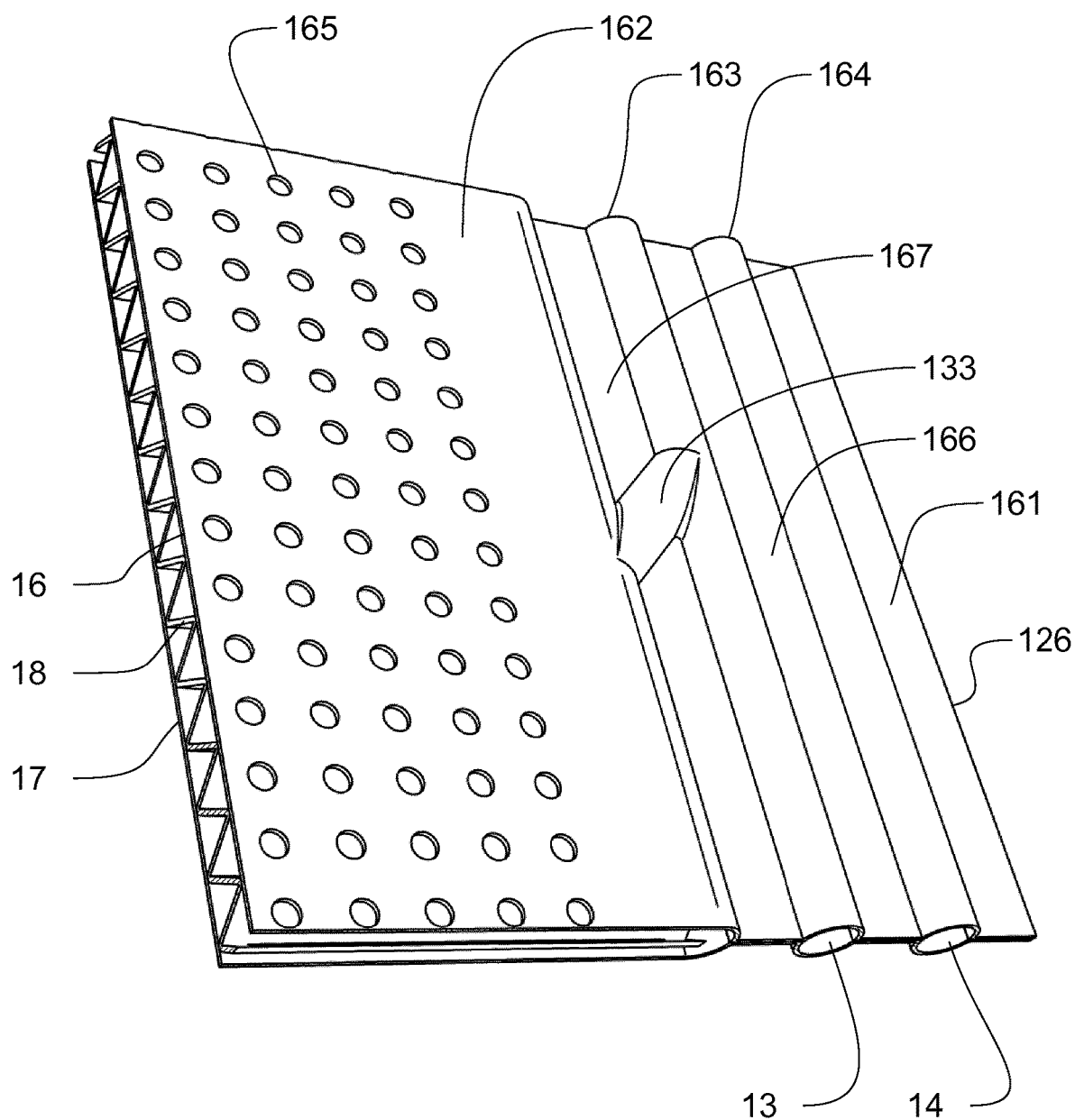
FIG. 3 represents a perspective view of a partial cut out (right edge) of the support of the membrane cartridge of FIG. 1.
Figure 4:
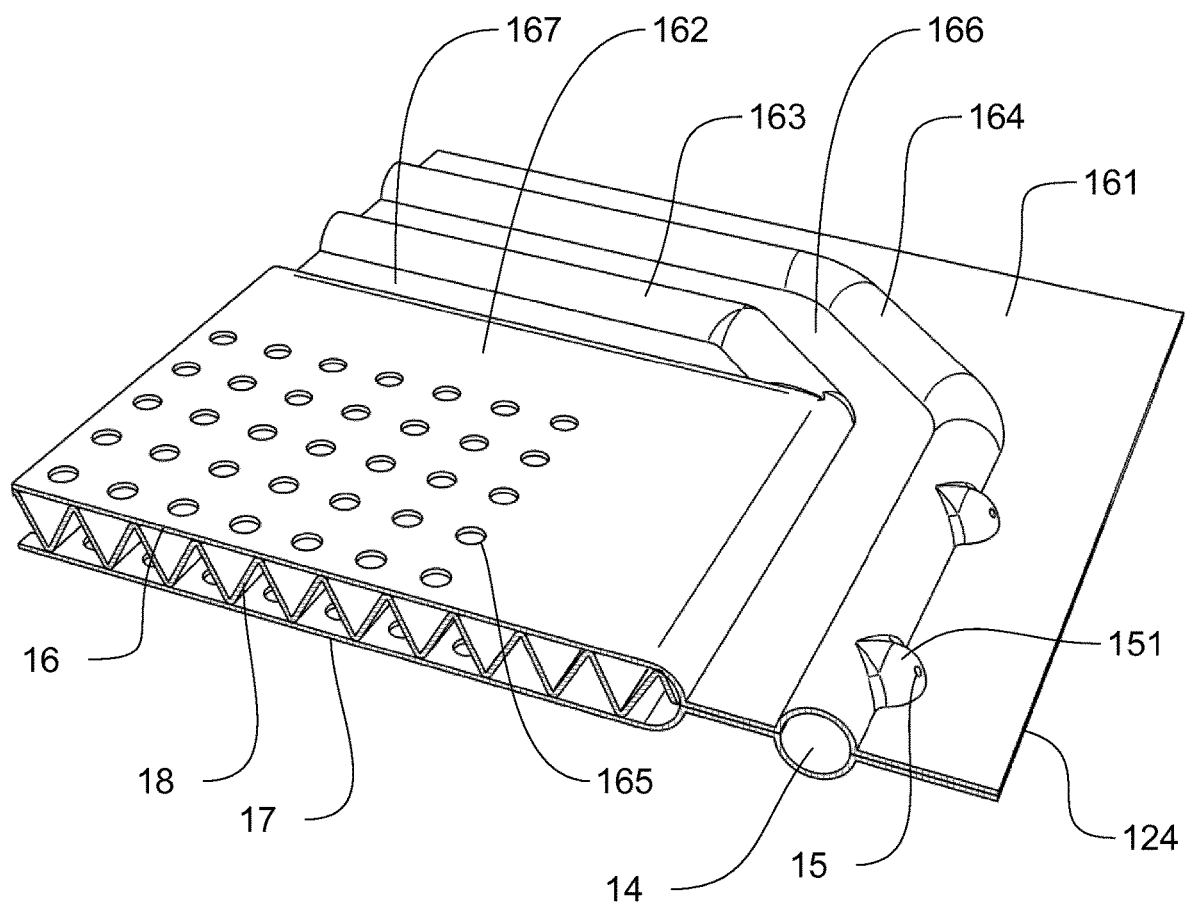
FIG. 4 represents a perspective view of a partial cut out (lower right corner) of the support of the membrane cartridge of FIG. 1.

Referring to FIGS. 2-4, the support 12 comprises two layers, each of which may be formed of a polymer sheet 16, 17 and which form a front face 121 and a back face 122 of the support 12, respectively. The support 12 and sheets 16, 17 extend between and are delimited by a top edge 123, a bottom edge 124, a left side edge 125 and a right side edge 126.

Either one, or both sheets 16, 17 comprise advantageously hollow embossments 162-164. These embossments refer to portions of the sheet which are raised or in relief, e.g. with respect to portions 161 of the sheet at the edges. Such embossments advantageously provide for fluid compartments (such as compartment 120—embossment 162) and channels (such as channels 13, 14—embossments 163, 164 respectively) integrated within the support. The sheets 16, 17 are sealed to each other at the edges of the various compartments and/or channels in order to separate or isolate different compartments and channels from one another. By so doing, different functionalities can be integrated in the support 12 as indicated above.

Each polymer sheet is advantageously a thermoplastic polymer sheet, which is advantageously nonporous, such as not having interconnected porosity, or fluid or liquid impermeable. The impermeability may e.g. refer to a water impermeability determined at 0.1 bar differential pressure. The embossments can be created in thermoplastic sheets by different techniques. One such technique is thermoforming. The sheets are heated to a suitable temperature, after which they are shaped with the embossments. This can be done by pressing the heated sheet through a pair of dies, of which one is the negative of the other. Another possibility is vacuum forming, in which the heated sheet is drawn over a die which is the negative of the desired shape of the sheet, and applying a vacuum at the side of the die. A sheet so obtained forms a support half, and by attaching the two sheets 16, 17 to each other at the back sides, the support 12 is formed with the various compartments and channels.

As shown in the figures, the sheets 16 and 17 are advantageously, though not necessarily, shaped identical to each other. To compose the support 12, they are assembled with their back faces against each other. When assembled, a symmetrical support is advantageously obtained, relative to a median plane 127 in which the sheets 16 and 17 are attached to each other and which is parallel to the front face 121 and the back face 122.

Figure 5:
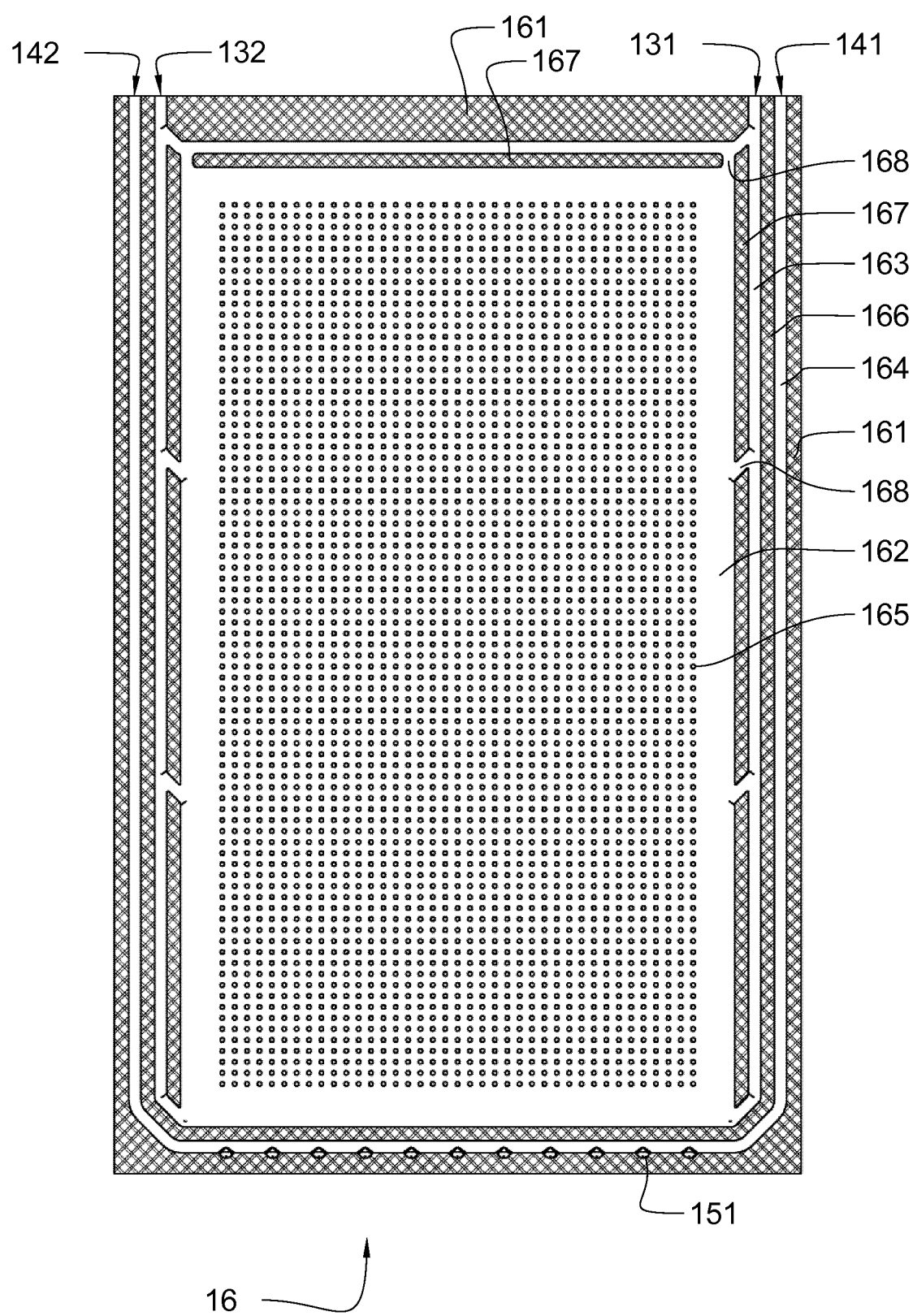
FIG. 5 represents a sectional view through the median plane of the support of the cartridge of FIG. 1.

The sheets 16, 17 comprise advantageously planar edge portions 161, 166, 167 provided along the edges of the various embossments 162, 163, 164. Assembling the two sheets 16, 17 at these edge portions allows for isolating and sealing the various fluid compartments 120 and channels 13, 14. The various edge portions are more clearly represented in FIG. 5, which shows sheet 16 as viewed from its back side, i.e. from the inside of compartment 120. The different edge portions are hatched for better visibility. One can discern an outermost edge portion 161 provided along the outer edges of sheet 16. Outermost edge portion 161 encloses all embossments provided in sheet 16, except for the fluid ports 131, 132, 141 and 142. Embossment 164 forming one half of channel 14 borders the inner edge of outermost edge portion 161. The embossment 164 is enclosed between the outermost edge portion 161 and an inner edge portion 166. Inner edge portion 166 encloses embossment 162 forming one half of fluid compartment 120. An additional embossment 163 with adjacent edge portion 167 may be provided between the inner edge portion 166 and embossment 162. The additional embossment 163 forms one half of channel 13 which at least partially and possibly completely surrounds the fluid compartment 120. Channel 13 is in fluid communication with fluid compartment 120 through fluid passages 133 formed by embossments 168. Channel 13 acts as a so called permeate contour channel providing for higher throughput and reducing flow resistance between the fluid compartment 120 and fluid outlet ports 131 and 132. Embossments 163 and 162 are separated by a contour edge portion 167.

The different edge portions 161, 166, 167 advantageously are coplanar, which facilitates assembling the sheets 16 and 17 to each other. The edge portions of the sheets can be attached to one another by known techniques, such as by adhesive, welding, such as ultrasonic welding, or lamination. When sheets 16 and 17 are assembled, a seal is hence formed in the edge portions. Since the edge portions surround or enclose respective embossments (fluid compartments), the fluid compartments can be efficiently made fluid tight at the periphery and be fluid-tightly separated from one another and from the surrounding ambient.

In the represented example, a first embossment 162 and corresponding fluid compartment 120 are arranged in a central area portion 128 of the sheet, with a second embossment 164 and corresponding air supply channel 14 located peripherally to it. Such a configuration allows for arranging the aeration holes 15 underneath the fluid compartment 120 (i.e., at the bottom edge of the support), with all fluid ports being arranged at the top edge of the support. It will be convenient to note that other configurations, e.g. with multiple fluid compartments which are isolated (i.e., fluid tightly sealed) from one another, are possible.

The polymeric sheets 16, and possibly 17 are made porous in the central area portion 128 corresponding to embossment 162, e.g. by perforating the sheet to obtain through holes 165, within the central area portion 128. The through holes 165 provide for a fluid path between the fluid compartment 120 and the semi-permeable membrane layer 11. Filtrate which is drawn through the semipermeable membrane layer 11 passes through the through holes 165 to end up in the fluid compartment 120, from which it is evacuated through the fluid outlet ports 131, 132.

The dimensions of the through-holes 165 are not particularly limited and suitable dimensions depend on the application. The through-holes advantageously have a size smaller than or equal to 2 mm, advantageously smaller than or equal to 1.5 mm, advantageously smaller than or equal to 1.2 mm, advantageously smaller than or equal to 1.0 mm, advantageously smaller than or equal to 0.5 mm. When the holes are too large, smooth coating may be problematic. The through-holes can have a size of at least 5 µm, advantageously at least 10 µm, advantageously at least 25 µm, advantageously at least 50 µm, advantageously at least 100 µm.

The through-holes can be such that the central area portion 128 of the sheet advantageously exhibits an open area (porosity due to the through-holes) of at least 2%, advantageously at least 5%, advantageously at least 10%, advantageously at least 15%, advantageously at least 20%, advantageously at least 25%, advantageously at least 30%, advantageously at least 35%. The open area is advantageously at most 70%, advantageously at most 60%, advantageously at most 55%, advantageously at most 50%. The open area refers to the area of the through-holes per unit total area of the outer surface (including the through-holes), expressed in percentage values. In defining the total area of the outer surface, any edge region which is not porous, is disregarded. The open area should advantageously be not too low to provide for sufficient flux through the support outer layers on the one hand, but neither too high in order not to compromise the stiffness of the support structure on the other. It will be convenient to note that the complement of the open area (i.e. 100%— open area) refers to the interfacial surface between membrane and support, which is the area that is available for bonding the membrane layer to the sheet. Hence also in this regard, the open area should not be too high.

There is no restriction on the cross-sectional shape of the through-holes 165, i.e. they may be circular, square, polygonal, star-shaped or slit-shaped holes, or holes of any other suitable shape.

The semi-permeable membrane layer 11 extends across the embossment 162 (central area portion 128), in order to cover the through holes 165. The semi-permeable membrane layer 11 is advantageously attached to sheet 16 by one or a combination of known techniques. As an advantage, support 12 allows for a semi-permeable membrane layer 11 to be directly cast from a membrane forming solution on the embossment 162. The membrane forming solution may penetrate the through holes 165 to form plugs at the back side of sheet 16 creating mechanical anchoring points as described in WO 2013/113928 8 Aug. 2013. In addition, or alternatively, the semipermeable membrane layer 11 can bond to the outer surface of embossment 162 by molecular entanglement. Such kind of bond, also referred to as solvent bonding and further described in WO 2015/140355 24 Sep. 2015, can be obtained by direct application of a membrane forming solution on the surface, where the solvent of the solution is able to soften or at least partially dissolve a surface portion of sheet 16, enabling molecules of the membrane polymer in solution and molecules of the sheet 16 to interact at the interface. Molecular entanglement is made permanent by precipitation of the polymer from the solution as described above. It will be convenient to note that any other suitable bonding technique, such as ultrasonic welding, can alternatively be used for attaching the semipermeable membrane layer to the support.

Figure 6:
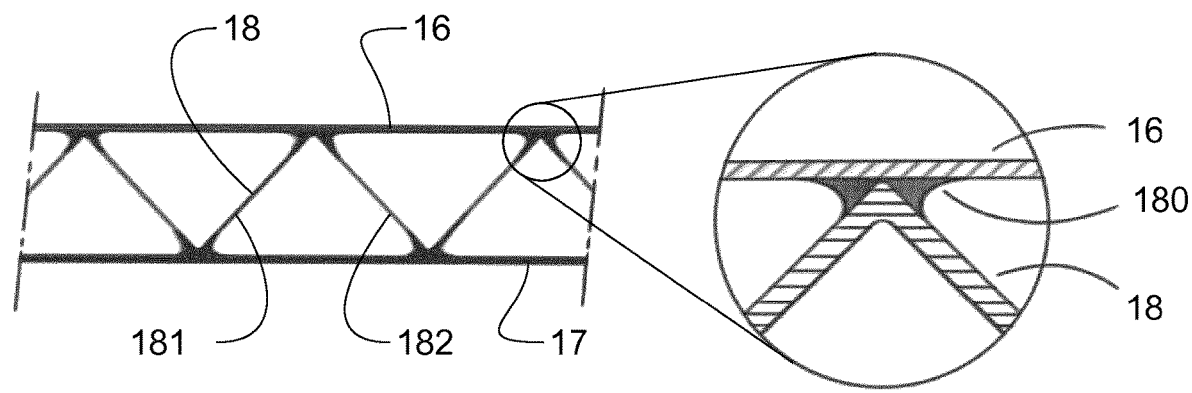
FIG. 6 represents a partial cross sectional view through the fluid compartment of the support of FIG. 1.

A reinforcement 18 can be arranged in fluid compartment 120, and extends between sheets 16 and 17. The reinforcement 18 increases rigidity of the support 12, and allows for maintaining a constant spacing between the embossments 162 of opposing sheets 16 and 17. Any suitable reinforcement can be used. Advantageously, reinforcement 18 is formed of a corrugated polymer sheet. The corrugated polymer sheet can be suitably attached to the outer sheets 16 and 17. By way of example, the peaks and valleys of the corrugated polymer sheet may be attached to the respective outer sheet 16, 17 through welding or adhesive, as shown in FIG. 6. Adhesive 180 can be arranged at locations corresponding to the peaks and valleys of reinforcement 18. After assembly of sheets 16 and 17, with reinforcement 18 in between, adhesive 180 can be cured or hardened. By way of example, adhesive 180 can be an ultraviolet light curable adhesive. The angle between touching leg portions 181, 182 of reinforcement 18 is not particularly limited. Suitable angles may range between 20° and 70°, advantageously between 45° and 60°.

It will be convenient to note that other structures can be used as reinforcement 18. An alternative possibility is a three-dimensional spacer fabric, in which each of the outer surfaces is bonded to the respective sheet 16 or 17. Yet another possibility is a sheet having nub like protrusions extending at both sides of the sheet, as described in US 2008/0000827 3 Jan. 2008. It will be convenient to note that reinforcement 18 may or may not be porous, and advantageously does not obstruct the through openings 165. In cases in which reinforcement 18 is nonporous, the legs 181, 182 can form web members, dividing the fluid compartment 120 in a plurality of separate channels which communicate with the permeate contour channel 13.

The central area portion 128 defined by embossment 162 is advantageously planar, and arranged at a raised level with respect to the edge portions 161, 166. Such an arrangement additionally allows for easily coating the central area portion with the semi-permeable membrane layer.

Figure 7:
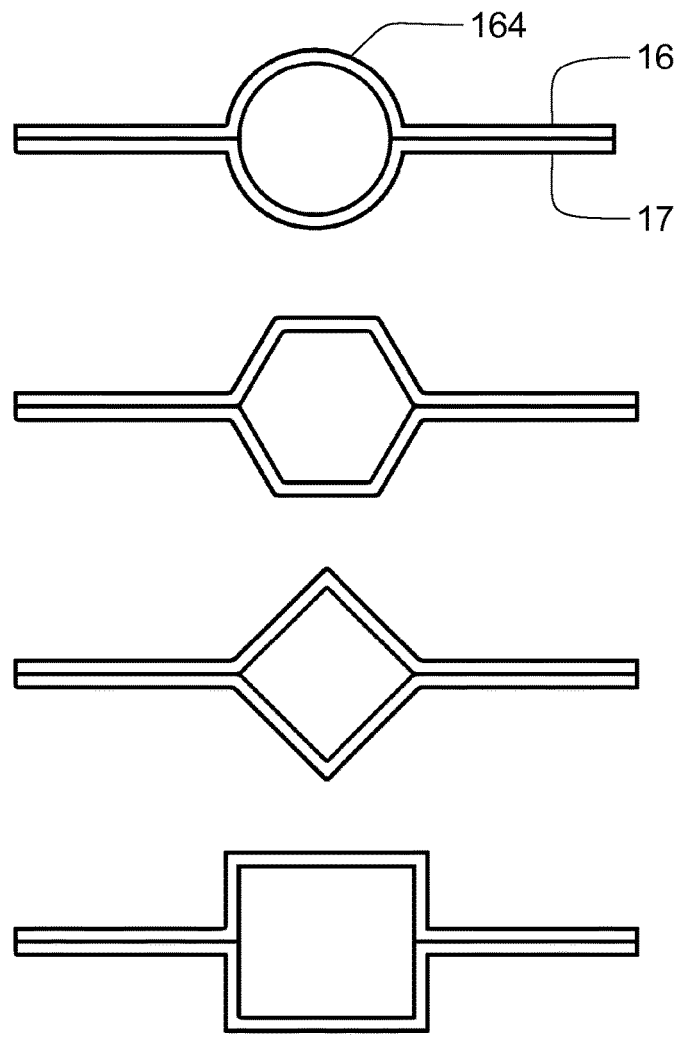
FIG. 7 represents possible cross sections for the channels in the support of the cartridge of FIG. 1.

There is no particular limitation on the shape of the channels 13 and 14. Referring to FIG. 7, these channels can have any suitable cross-sectional shape which is in principle only limited by the technique used for making the embossments in the sheets. Possible cross-sectional shapes are circular or polygonal. A circular cross-section may be advantageous, since it may have the highest cross-sectional area for a given diameter, it shows the highest resistance against deformation upon applied pressure difference and it has a better flow pattern.

Suitable thicknesses for the thermoplastic sheets 16, 17 range between 0.01 mm and 2 mm. The thermoplastic sheets advantageously have a thickness equal to or smaller than 1.5 mm, advantageously equal to or smaller than 1 mm, advantageously equal to or smaller than 0.85 mm. The thickness of the thermoplastic sheets is advantageously at least 0.075 mm, advantageously at least 0.1 mm.

Suitable materials for the polymer sheets and/or the reinforcement 18 are thermoplastic materials, such as ABS (Acrylonitrile Butadiene Styrene), Acrylic such as PMMA (Polymethyl Methacrylate, e.g. Plexiglas®), PE (Polyethylene) such as HDPE (High Density Polyethylene), PS (Polystyrene) such as HIPS (High Impact Polystyrene), KYDEX (a PMMA/PVC blend), PC (Polycarbonate), PEI (Polyetherimide) such as Ultem® sheets, PETG (Polyethylene Terephthalate Glycol), PP (Polypropylene), PVC (Polyvinyl Chloride), TPO (Thermoplastic Polyolefin). It will be convenient to note that the polymer sheet can be made of a compound comprising different polymers and may comprise reinforcement fibres. In principle, any sheet material which can be embossed may be used for sheets 16, 17 and for the reinforcement 18. Advantageously, sheets 16, 17 and reinforcement 18 are made of a same, or at least similar material in order to avoid any thermal stresses and to ease assembly.

An important aspect of the invention, is that support 12 is provided with at least two separate fluid compartments. The fluid compartment 120 and the permeate contour channel 13 are fluidly connected and form a first compartment. The air supply channel 14 forms a second compartment and is isolated—that is, fluid tightly sealed—from the first compartment by sealed inner edge portions 166 of sheets 16 and 17. Advantageously, each of the first and second compartments has separate fluid ports 131, 132 and 141, 142 respectively.

Air supply channels 14 convey air to aeration holes 15, which may be provided on the front face 121 through sheet 16, on the back face 122 through sheet 17, or both on the front face and on the back face. The air is expelled through aeration holes 15 to the outside to form air bubbles, e.g. in the waste water in which the cartridge 10 is immersed. As the aeration holes 15 are integrated in the support 12 and attached to the central area portion 128 through edge area portion 166 of sheet 16, the air bubbles are forced to rise along the membrane 11. This ensures that air bubbling is uniformly provided at each face of the support, and therefore for each membrane surface of the cartridge, and, by extrapolation, for each membrane surface of the stack. Additionally, an aerator being directly integrated in the cartridge 10, leads to a more compact arrangement.

Advantageously, the width of the outermost edge 161 along the bottom edge 124 ensures that each bubble exiting aeration hole 15 on the front face 121 rises along the front surface 121, preventing any air bubble flipping to the back face 122 and vice versa. The width of the edge portion 161 between the bottom edge 124 and the centre of the hole 15 is advantageously at least 5 mm, advantageously at least 10 mm, advantageously at least 15 mm.

It can be seen on FIG. 4 that the aeration holes 15 are advantageously arranged in pockets 151 projecting downwards from channel 14. Holes 15 are arranged in proximity of or at a bottom edge of the pockets 151 in order to avoid a stagnant zone of waste water in the channel 14, or pockets 151. A strip of resilient material (elastomeric or silicone)

may be provided to cover the aeration holes 15. The strip comprises a slit at a location corresponding to aeration hole 15 to allow air bubbles to escape. The slit will open only when the channel 14 is pressurized, and will close, or at least reduce the size of the hole 15, when no air is supplied (e.g., during a backwash cycle). The resilient strip prevents clogging of the holes.

It will be convenient to note that additional fluid compartments can be provided as desired.

It will be convenient to note that the membrane layer 11 advantageously extends only over the central area portion defined by embossment 162. Other portions of support 12 are generally not covered by membrane layer 11.

The cartridge 10 of FIG. 1 is configured for vertical placement in a feed, so that the air supply channels 14 run vertically and the aeration holes 15 form a horizontal array arranged adjacent the bottom edge 124 of the support. Advantageously, the inlet/outlet ports 131, 132 and 141, 142 are provided at the top, advantageously projecting vertically from the top edge 123 of the support 12.

The provision of an integrated aeration/air bubbling system is not the only additional integrated functionality which is rendered possible by the aspects disclosed herein. Separate fluid compartments can be used for other purposes in addition, or alternatively to air bubbling. By way of example, a multitude of separate fluid compartments 120 may be provided in the support 12. Each of the separate fluid compartments may be covered with a different membrane layer 11, e.g. they can be arranged for separating different compounds from a feed stream, in which case the support can have separate permeate outlet ports for each compartment, allowing for separately extracting different permeates. By way of example, one membrane layer can be a hydrophilic semi permeable membrane for liquid extraction from a feed stream. Another membrane layer can be a hydrophobic semi permeable membrane acting as a gas diffusion layer for gas extraction from, or gas injection in the feed stream. The gas diffusion layer could e.g. be used for dissolving a gas in the feed stream in the proximity of the liquid extraction membrane layer. The dissolved gas could e.g. induce or enhance a number of chemical reactions beneficial for permeate extraction. Alternatively, chemical compounds, such as antiscalants, either in gas or liquid form, can be dosed to the surrounding liquid by injection from the fluid compartment, through a respective membrane layer. In a yet additional alternative, separate membrane layers and respective fluid compartments can be used for selective removal of possibly inhibiting compounds, e.g. by liquid/liquid extraction. In a still alternative embodiment, separate membrane layers can each have a selectivity towards different reaction products, and hence be used for separately removing different reaction products from a feed stream. It will be convenient to note that membrane cartridges as described herein may be configured to be arranged in any suitable orientation in a module, e.g. horizontal or inclined, in addition to vertical.

It will be clear from the above that the way the support is formed, by shaping polymer sheets which are attached to one another and sealing different compartments allows for easily integrating any number of channels and fluid compartments within the support. Additional channels can be integrated, e.g. for circulating a cooling or heating fluid through the support. This can be used when it is desirable to control the temperature of the feed stream in which the cartridge is immersed, or the temperature of the permeate.

The outermost edge portion 161, which is advantageously planar, can advantageously be used as an attachment lip, e.g. which is inserted in corresponding guiding grooves in a module container (not shown). As a further advantage, the cartridges 10 are completely frameless, which reduces manufacturing cost and allows for an undisturbed flow pattern leading to a reduced obstruction of the spacing between opposite membranes.

Referring to FIGS. 8 and 9, filtration cartridges 10 can be stacked by placing the front surface 121 of one cartridge and the back surface 122 of a consecutive cartridge in a facing relationship and spaced apart from one another. Spacing and/or connecting members 19 can advantageously be arranged on anyone edge portion of the support 12, such as on outermost edge portion 161. Members 19 can comprise spacing members 191, 192 projecting from either one or both front face 121 and back face 122 of the support. Members 19 can comprise additionally, or alternatively connectors for attaching the cartridge to a consecutive one in stack 80. The connectors can be cooperating click fit connectors 193, 194. Advantageously, members 19 are embossments in the sheets 16 and 17.

Port connectors (not shown) may be attached to the fluid ports 131, 132 and 141, 142 when attaching the two sheets 16 and 17 together. The Port connectors may provide for coupling all cartridges of stack 80 to one or more distribution manifolds.

It will be convenient to note that, even though in the above examples the cartridges have been described as being provided with a membrane layer at both front and back faces, this is not a requirement. Cartridges according to the invention can work with a membrane layer attached to one surface (e.g. front face) of the support only. In such case the back face layer 17 need not comprise any embossment nor perforation at all.

Even though membrane cartridges having a rectangular shape have been described above, it will be convenient to note that aspects described herein are not limited to such shapes. By way of example, disc like cartridges can be contemplated as well.

Figure 10:
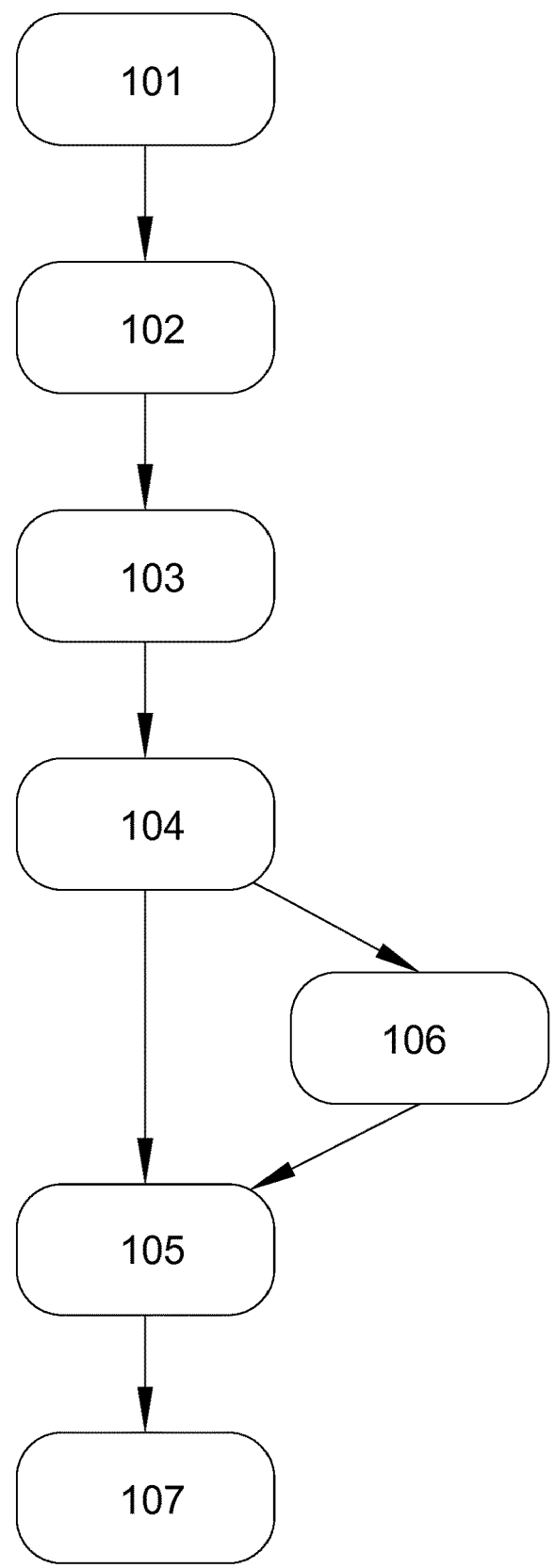
FIG. 10 represents a flowchart with process steps for manufacturing membrane cartridges according to aspects described herein.

A process 100 for manufacturing the cartridges 10 as described hereinabove will now be described in relation to the flow chart of FIG. 10. In a step 101, a first layer, advantageously a nonporous or dense polymer sheet is made porous in a first area portion 128, such as through perforating, e.g. by laser or punching or needle piercing or any other suitable technique. The first area portion is enclosed by an edge area portion 161 in which the first layer advantageously remains nonporous. In a step 102, one or more second area portions, such as the area portion for channels 14 and aeration holes 15 may be defined on the first layer, all of them being surrounded by the edge area portion 161. The second area portions are spaced apart from the first area portion 128 by at least one additional edge area portion 166. The first layer in the second area portions can be nonporous. Additional edge area portions 167 may be defined, such as between the first and the second area portions.

In a step 103, the first layer is shaped to make embossments 162-164 in the first area portion 128 and the one or more second area portions, relative to the edge area portions. The embossments project from the front face 121 of the layer. The layer is advantageously planar in the edge area portions. Advantageously, all edge area portions are coplanar. The embossments can be made through any suitable forming technique, such as thermoforming or vacuum forming as described above. It will be convenient to note that step 101 and/or step 102 can be performed simultaneous with, or following step 103.

In a step 104, a second layer is provided, having an area at least corresponding to the area of the first sheet. The second layer is advantageously nonporous, at least in areas corresponding to the edge area portions of the first sheet. The second layer is advantageously a polymer sheet. It can be formed with embossments and can be formed as a mirror shape of the first sheet. It can advantageously be of identical shape as the first sheet.

In a step 105, the first layer is attached at its edge area portion(s) 161, 166, 167 to the second layer so that the back faces of the first layer and the second layer face each other. The attachment of the first and second layers at the edge area portion(s) is such that a seal is formed peripherally of the first and/or second area portions. The first sheet can be attached to the second layer by any suitable technique, such as by adhesive, welding or laminating. Prior to attachment, a reinforcement 18 can be interposed between the first sheet and the second layer in an intermediate step 106. The reinforcement 18 is advantageously bonded to anyone of, or both the first layer and the second layer. The reinforcement 18 can be obtained by corrugating a third polymer sheet. An adhesive is advantageously applied on the peaks and valleys of the third corrugated sheet prior to inserting between the first sheet and the second layer. The adhesive may be hardened or cured following attachment of the first layer to the second layer.

In a step 107, the first area portion is covered with a semipermeable membrane layer 11, advantageously through a direct coating technique on the first area portion. The edge area portions, and generally all area portions where the first sheet is nonporous, need not be coated or covered with the membrane layer. It will be convenient to note that the membrane layers 11, etc. can be formed on the support either before attaching the first layer and second layer to each other, or thereafter. Conventional coating techniques, such as slot coating or knife coating can be used for forming the membrane layer 11 on the support.

In an alternative process, in step 101, the first area portion 128 of the first layer is replaced with a porous layer, such as a woven or nonwoven sheet, advantageously made of thermoplastic filaments, advantageously monofilaments so that the perforation step is omitted. The process then continues with steps 102 through 107 as described above.

The invention claimed is:

1. A planar membrane cartridge, comprising a support and a semi-permeable membrane layer, the support comprising:
   a first layer attached to a second layer and defining a front face and a back face of the support respectively;
   each of the first layer and the second layer comprising a central area portion and an edge area portion enclosing the central area portion;
   wherein the central area portion of either one or both of the first layer and the second layer is porous and covered by the semi-permeable membrane layer, wherein the semi-permeable membrane layer is attached to the respective first layer and second layer;
   wherein the central area portion of the first layer comprises a first embossment, wherein the first embossment defines a fluid compartment between the first layer and the second layer, wherein the central area portion of the first layer is planar and arranged at a raised level with respect to the edge area portion of the first layer;
   wherein the edge area portions of the first layer and the second layer are attached to form a seal of the fluid compartment;
   wherein each of the first layer and the second layer comprises a channel area portion spaced apart from the central area portion and being surrounded by the edge area portion,
   wherein the channel area portion of at least one of the first layer and the second layer comprises a second embossment protruding from the edge area portion of the respective one of the first layer and the second layer, wherein the second embossment extends from a fluid port at a top edge of the cartridge to underneath the central area portion, and wherein the second embossment defines an internal channel between the first layer and the second layer which is isolated from the fluid compartment by the edge area portion.

2. The planar membrane cartridge of claim 1, wherein the central area portions of the first layer and the second layer comprise symmetrical embossments forming the fluid compartment and the internal channel.

3. The planar membrane cartridge of claim 1, wherein the central area portions of the first layer and the second layer are porous and wherein a second semi-permeable membrane layer is attached to the other one of the first layer and the second layer and covers the respective central area portion.

4. The planar membrane cartridge of claim 1, wherein at least one of the first layer and the second layer is made of a nonporous polymer sheet, wherein the nonporous polymer sheet is made porous by through openings through the polymer sheet in the central area portion.

5. The planar membrane cartridge of claim 1, wherein the edge area portion of the first layer comprises an inner edge area portion surrounding the respective central area portion and an outer edge area portion surrounding the inner edge area portion, wherein the inner edge area portion and the outer edge area portion are coplanar, wherein the respective channel area portion is intermediate the inner edge area portion and the outer edge area portion.

6. The planar membrane cartridge of claim 1, wherein the channel area portion of the first layer and the second layer are free from covering by the semi-permeable membrane layer.

7. The planar membrane cartridge of claim 6, wherein the first layer comprises at least one through opening in the channel area portion.

8. The planar membrane cartridge of claim 1, wherein the first layer has a thickness smaller than or equal to 2 mm.

9. The planar membrane cartridge of claim 1, comprising a reinforcement extending between the first layer and the second layer within the fluid compartment.

10. The planar membrane cartridge of claim 9, wherein the reinforcement is a corrugated polymer sheet attached to the first layer and to the second layer.

11. The planar membrane cartridge of claim 1, comprising a spacing member arranged on the front face in the edge area portion and a corresponding member arranged on the back face at a location corresponding to the spacing member, wherein the spacing member and the corresponding member comprise cooperating snap fit connectors.

12. The planar membrane cartridge of claim 1, wherein each of the fluid compartment and the internal channel comprises a fluid communication port.

13. The planar membrane cartridge of claim 12, wherein the central area portion of at least one of the first layer and the second layer further comprise:
   an additional embossment arranged at a periphery of the first embossment, the additional embossment and the first embossment being separated by a second edge portion in which the first layer and the second layer are attached, and a plurality of embossments connecting the additional embossment to the first embossment, wherein the additional embossment forms a contour channel in fluid communication with the fluid compartment through fluid passages formed by the plurality of embossments and in fluid communication with the fluid communication port of the fluid compartment.

14. A filtration module, comprising:

a stacked arrangement of a plurality of planar membrane cartridges of claim 12.

15. A method of manufacturing a planar membrane cartridge, comprising:

providing a first layer and a second layer and defining for each of the first layer and the second layer an edge portion and a central area portion enclosed by an edge area portion, wherein at least one of the first layer and the second layer is porous in the central area portion, defining for each of the first layer and the second layer a channel area portion, the channel area portion being spaced apart from the central area portion by the edge area portion and being surrounded by the edge area portion, shaping the first layer to form a first embossment, wherein the first embossment defines the central area portion of the first layer, and wherein the central area portion of the first layer is planar and arranged at a raised level with respect to the edge area portion of the first layer, shaping at least one of the first layer and the second layer such that a respective one of the first layer and the second layer protrudes in the channel area portion from the edge area portion of the respective one of the first layer and the second layer to form a second embossment, wherein the second embossment extends from a fluid port at a top edge of the cartridge to underneath the central area portion, attaching the edge area portions of the first layer and the second layer, wherein a fluid compartment is defined by the first embossment and an internal channel is defined by the second embossment, wherein a seal is formed peripherally to the fluid compartment and to the internal channel in the edge area portion, the internal channel being isolated from the fluid compartment, and covering the porous one of the central area portions of the first layer and the second layer with a semi-permeable membrane layer.

16. The method of claim 15, wherein the one of the first layer and the second layer comprising the porous central area portion consists of a nonporous polymer sheet, the method comprising making the central area portion porous by perforating the polymer sheet.

17. The method of claim 16, wherein the central area portions of both the first layer and the second layer are porous, wherein the first layer and the second layer consist of a nonporous polymer sheet, the method comprising making the central area portions by perforating the polymer sheet, wherein the step of shaping the first layer and the step of shaping at least one of the first layer and the second layer comprise embossing the respective first layer and second layer at the respective central area portion and channel area portion.

18. The method of claim 16, wherein the nonporous polymer sheet is made of a thermoplastic polymer.

19. The method of claim 15, wherein covering the porous one of the central area portions comprises coating the respective central area portion with a membrane forming solution and forming the semi-permeable membrane layer from the membrane forming solution.

20. The method of claim 15, comprising making at least one through-opening through at least one of the first layer and the second layer in the channel area portion.

21. The method of claim 15, comprising providing each of the fluid compartment and the internal channel with a fluid communication port.

* * * * *